United States Patent
Kanie

(10) Patent No.: US 6,869,124 B2
(45) Date of Patent: Mar. 22, 2005

(54) FOOTREST ASSEMBLY AND CLIP FOR FOOTREST ASSEMBLY

(75) Inventor: Hideki Kanie, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/761,114

(22) Filed: Jan. 20, 2004

(65) Prior Publication Data

US 2004/0178653 A1 Sep. 16, 2004

Related U.S. Application Data

(63) Continuation of application No. PCT/US02/24193, filed on Jul. 31, 2002.

(30) Foreign Application Priority Data

Jul. 31, 2001 (JP) ........................................ 2001-231151

(51) Int. Cl.[7] ................................................. B62J 25/00
(52) U.S. Cl. ........................................................ 296/75
(58) Field of Search ........................... 296/75; 180/90.6; 411/340, 437, 908

(56) References Cited

U.S. PATENT DOCUMENTS

| | | | |
|---|---|---|---|
| 4,828,444 A | | 5/1989 | Oshida |
| 4,890,966 A | | 1/1990 | Umezawa |
| 6,478,359 B2 | * | 11/2002 | Dendo et al. ................. 296/75 |

FOREIGN PATENT DOCUMENTS

| | | |
|---|---|---|
| DE | 35 17 620 A1 | 11/1985 |
| EP | 0 590 993 A1 | 4/1994 |
| GB | 2 344 569 | 6/2000 |
| JP | 64-29520 | 2/1989 |
| JP | 8-82312 | 3/1996 |
| JP | 10-338068 | 12/1998 |

* cited by examiner

*Primary Examiner*—Lori L. Coletta
(74) *Attorney, Agent, or Firm*—Harness, Dickey & Pierce, P.L.C.

(57) ABSTRACT

A footrest assembly comprises a footrest (45) made of plastic material, and a clip (9) provided on the floor-facing side of the footrest to receive therein a threaded stud (51) fixed on a floor (50). The clip (9) includes a first clip component (10) having an engagement pawl (26) adapted to engage with the stud, and a second clip component (11) capable of releasing the engagement between the engagement pawl of the first clip component (10) and the stud. The first clip component (10) is formed as a tubular body having the engagement pawl on the inside thereof and is immovably fixed to the footrest. The second clip component (11) is received in a tubular portion of the first clip component in a rotatable manner about the axis of the tubular portion to allow selective angular rotation of the second clip component (11) between an engagement position (FIG. 10) where the engagement pawl of the first clip component is allowed to engage with the stud and a release position where the engagement pawl (26) is bent not to engage with the stud (51).

12 Claims, 7 Drawing Sheets

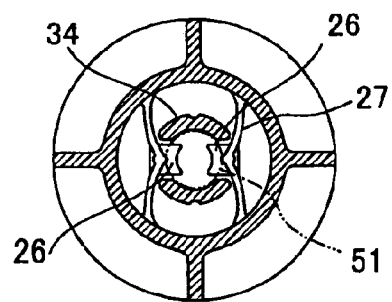
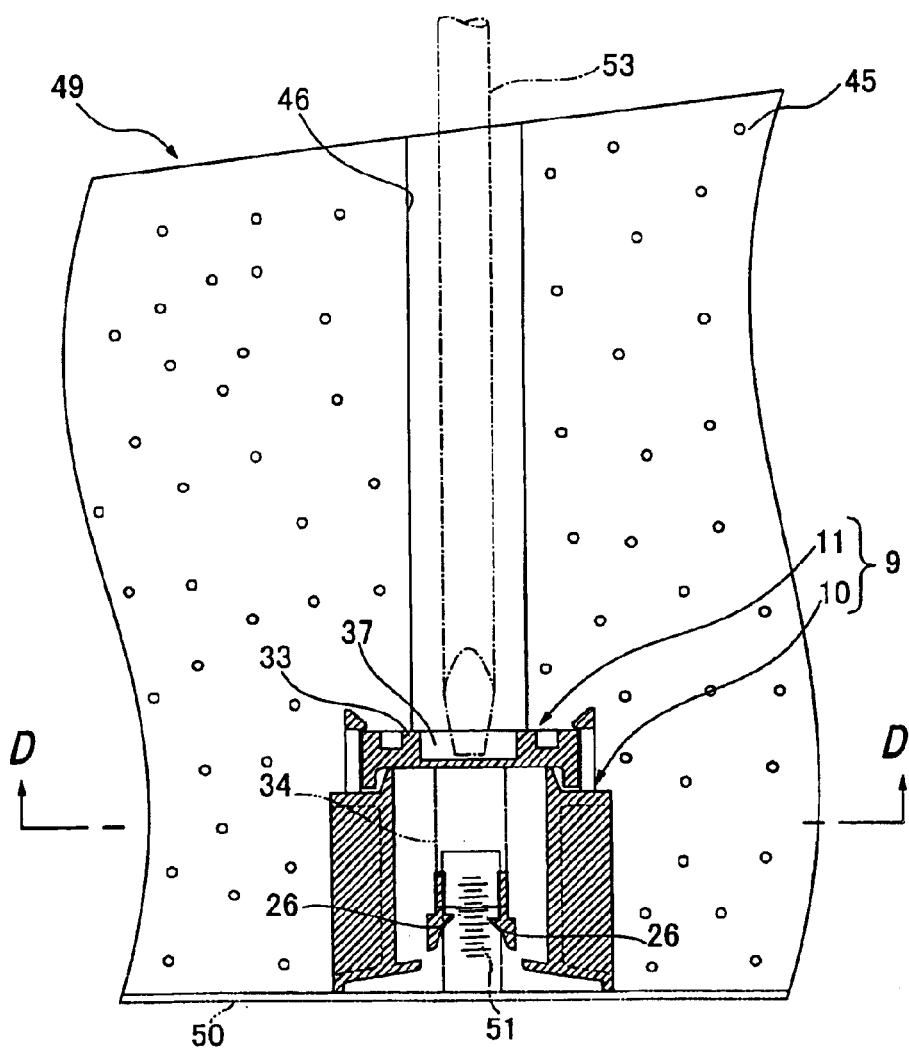

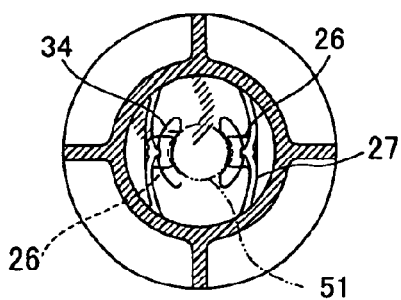
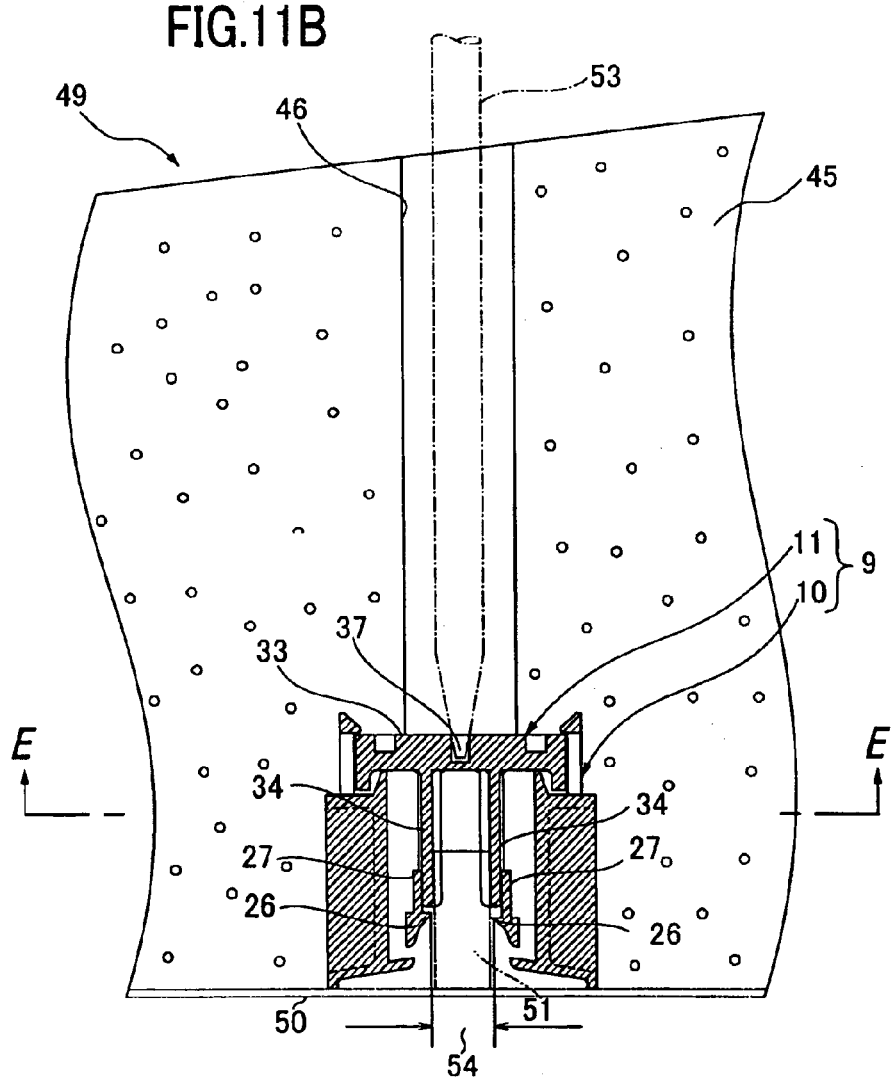

FOOTREST ASSEMBLY AND CLIP FOR FOOTREST ASSEMBLY

CROSS-REFERENCE TO RELATED APPLICATIONS

The present application is a continuation of international patent application PCT/US02/24193, filed on Jul. 31, 2002, and claims priority of Japanese patent application 2001-231151, filed on Jul. 31, 2001.

FIELD OF THE INVENTION

The present invention relates to a footrest assembly to be mounted on a floor of a vehicle body by use of a stud fixed on the floor, such as a threaded stud or a rod-shaped stud having a groove in the periphery thereof, and a clip for the footrest assembly.

BACKGROUND OF THE INVENTION

Various methods have been employed to mount a footrest on a floor of a vehicle body. By way of example, the footrest can be mounted by use of a stud fixed on the floor, such as a threaded stud or a rod-shaped stud having a groove in the periphery thereof. Japanese Utility Model Laid-Open No. 01-29520 (U. M. Publication No. 5-01686) discloses a structure for mounting an accelerator-pedal stopper by use of a threaded stud fixed on a floor. The accelerator-pedal stopper mounting structure can achieve a simplified attaching operation by virtue of the threaded stud on the floor. If this mounting structure is applied to a footrest and a vehicle body is deformed due to a vehicle collision or the like, however, the footrest might be moved toward a vehicle compartment, resulting in undesirable damage of a driver's foot placed on the footrest.

Japanese Patent Laid-Open No. 2000-168422 discloses a footrest assembly capable of absorbing impact from a collision or the like in order to prevent the aforementioned damage. FIG. 1 as attached herein shows the footrest assembly 1. In FIG. 1, the footrest assembly 1 includes a solid footrest 2 which is made of plastic material having a shock absorbing effect such as urethane to absorb impact from a collision or the like, and a pair of tubular clips 5, each of which is adapted to receive therein a stud fixed on a floor of an vehicle body, such as a threaded stud or a rod-shaped stud having a groove in the periphery thereof. The pair of clips 5 are immovably fixed in the footrest on the floor-facing side 3 of the footrest at respective positions corresponding to the studs. Thus, the footrest can be reliably positioned by use of the studs. The above footrest assembly disclosed in Japanese Patent Laid-Open No. 2000-168422 can be reliably positioned to the floor by itself without any adverse effect from a carpet covering over the floor and can mold the footrest and the clip integrally. This is advantageous not only to absorbing impact from a collision or the like but also to facilitating the control, handling and attaching operation of the footrest assembly. However, when temporarily or permanently detached for replacement of the carpet or other parts, maintenance or servicing, it has been difficult to detach the above footrest assembly from the floor.

It is therefore an object of the present invention to facilitate a detaching operation of a footrest assembly having an integrally molded clip, capable of reliably positioning a footrest by use of a stud fixed on a vehicle floor and absorbing impact from a vehicle collision or the like.

SUMMARY OF THE INVENTION

In order to achieve the above object, according to the present invention, there is provided a footrest assembly including: a solid footrest made of plastic material; and a clip provided on the floor-facing side of the footrest to receive therein a stud fixed on a floor of a vehicle body and formed as a threaded stud or a rod-shaped stud having a groove in the periphery thereof, whereby the footrest can be mounted on the floor by pushing the footrest assembly toward the floor with receiving the stud in the clip. In this footrest assembly, the clip comprises a first clip component having an engagement pawl adapted to engage with the stud, and a second clip component capable of releasing the engagement between the engagement pawl of the first clip component and the stud. The first clip component is formed as a tubular body having the engagement pawl on the inside thereof and is immovably fixed to the footrest. The second clip component is received in a tubular portion of the first clip component in a rotatable manner about the axis of the tubular portion to allow selective angular rotation of the second clip component between an engagement position where the engagement pawl of the first clip component is allowed to engage with the stud and a release position where the engagement pawl is bent not to engage with the stud.

The above footrest assembly can be reliably positioned and fixed to the floor by the first clip component while keeping the shock absorbing effect of the footrest. In addition, the engagement between the first clip component and the stud can be released only by rotating the second clip component by a certain angle from the engagement position to the release position, and thereby the whole of the footrest assembly can be readily detached from the floor. When the detached footrest assembly is reused, the second clip component is returned to the engagement position to allow the first clip component to be engaged with the stud, and then the footrest assembly is pushed toward the floor with receiving the stud in the first clip component. Thus, the footrest assembly can be mounted on the floor to facilitate the reuse.

In one embodiment of the above footrest assembly, the second clip component may be formed to be received in the first clip component in its entirety. In this case, the second clip component includes a head having a diameter to be received in an upper segment of the first clip component, and a release cam extending downward from the head to a position adjacent to the engagement pawl. The release cam is formed not to engage with both the engagement pawl and an extension of the engagement pawl when the second clip component is in the engagement position, but to engage with the engagement pawl or the extension so as to move the engagement pawl away from the stud when the second clip component is in the release position. Further, the top surface of the head of the second clip component is formed with a tool engagement portion, and the footrest is formed with a hole extending from the surface thereof to allow a tool to be engaged with the tool engagement portion. Thus, the footrest assembly can be detached only by inserting the front edge of the tool such as a screwdriver into the hole to engage the front edge of the tool with the tool engagement portion of the head of the second clip component and then rotating the second clip component by a predetermined angle (e.g. 90-degrees).

The side surface of the head of the second clip component and the inner peripheral surface of the first clip component surrounding the side surface of the head may be formed with a combination of a protrusion and a depression to be fitted moderately with the protrusion, for preventing the angular rotation of the second clip component when the second clip component is in the engagement position. This can prevent the second clip component from being improperly rotated from the engagement position. In addition, based on the fitting action, an operator can perceive the completion of the rotation from the release position to the engagement position.

Further, the engagement pawl of the first clip component may be provided with a release lever at a position engaging with the release cam. This release lever is connected to the inner wall of the tubular body of the first clip component so that the engagement pawl is applied with a resilience biasing in the direction allowing engagement with the stud, and the release lever is formed to be bent to allow said engagement pawl moving radially outward to disengage from the stud when the release cam engages with the release lever at the release position. This can assure the engagement and release between the engagement pawl and the stud. Further, the release lever and the release cam may be formed with a combination of a protrusion and a depression to be fitted moderately with the protrusion, for preventing the angular rotation of the second clip component when the second clip component is in the release position. An operator can perceive the completion of the rotation from the engagement position to the release position based on the fitting action.

In order to prevent the plastic material from entering inside the first clip component during the molding process of the footrest, the head of the second clip component may be formed as a circular plate to be brought into tight contact with a hollowed cylindrical portion formed in the upper segment of the first clip component so as to seal the upper segment of the first clip component, and the first clip component may have an outer peripheral wall extending continuously from the upper segment to a stud-receiving opening so as to surround the inner space of the first clip component.

According to the present invention, there is further provided a clip for a footrest assembly. The clip is provided on the floor-facing side of a solid footrest made of plastic material so as to fixedly mount the footrest on a floor of a vehicle body by use of a stud fixed on the floor and formed as a threaded stud or a rod-shaped stud having a groove in the periphery thereof. This clip comprises: a first clip component having an engagement pawl adapted to engage with the stud; and a second clip component capable of releasing the engagement between the engagement pawl of the first clip component and the stud. The first clip component is formed as a tubular body having the engagement pawl on the inside thereof, and the first clip component is adapted to be immovably fixed to the footrest. Further, the second clip component is received in a tubular portion of the first clip component in a rotatable manner about the axis of the tubular portion to allow selective angular rotation of the second clip component between an engagement position where the engagement pawl of the first clip component is allowed to engage with the stud and a release position where the engagement pawl is bent not to engage with the stud.

According to this clip, the engagement between the first clip component and the stud can be released only by rotating the second clip component by a certain angle from the engagement position to the release position, and thereby the whole of the footrest assembly can be readily detached from the floor. When the detached footrest assembly is reused, the second clip component is returned to the engagement position to allow the first clip component to be engaged with the stud, and then the footrest assembly is pushed toward the floor with receiving the stud in the first clip component. Thus, the footrest assembly can be mounted on the floor to facilitate the reuse. In addition, the second clip component is received in the first clip component to form a single clip in their entirety. This allows the clip to be integrally molded with the footrest, as an insert during the molding process of the footrest.

In one embodiment of the above clip, the second clip component may also be formed to be received in the first clip component in its entirety. In this case, the second clip component includes a head having a diameter to be received in an upper segment of the first clip component, and a release cam extending downward from the head to a position adjacent to the engagement pawl. The release cam is formed not to engage with both the engagement pawl and an extension of the engagement pawl when the second clip component is in the engagement position but to engage with the engagement pawl or the extension so as to move the engagement pawl away from the stud when the second clip component is in the release position. Further, the top surface of the head of the second clip component is formed with a tool engagement portion. In this embodiment, the side surface of the head of the second clip component and the inner peripheral surface of the first clip component surrounding the side surface of the head may be formed with a combination of a protrusion and a depression to be fitted moderately with the protrusion, for preventing the angular rotation of the second clip component when the second clip component is in the engagement position.

Further, the engagement pawl of the first clip component may be provided with a release lever at a position engaging with the release cam. This release lever is connected to the inner wall of the tubular body of the first clip component so that the engagement pawl is applied with a resilience biasing in the direction allowing engagement with the stud, and the release lever is formed to be bent to allow said engagement pawl moving radially outward to disengage from the stud when the release cam engages with the release lever at the release position. The release lever and the release cam may be formed with a combination of a protrusion and a depression to be fitted moderately with the protrusion, for preventing the angular rotation of the second clip component when the second clip component is in the release position.

In order to prevent the plastic material from entering inside the first clip component during the molding process of the footrest, the head of the second clip component may be formed as a circular plate to be brought into tight contact with a hollowed cylindrical portion formed in the upper segment of the first clip component so as to seal the upper segment of the first clip component, and the first clip component may have an outer peripheral wall extending continuously from the upper segment to a stud-receiving opening so as to surround the inner space of the first clip component.

BRIEF DESCRIPTION OF THE DRAWINGS

FIGS. 10A and 10B are sectional views showing an exemplary operation of a footrest assembly according to an embodiment of the present invention which is mounted on a floor.

FIGS. 11A and 11B are sectional views showing an exemplary state that the second clip component is moved to a release position for detaching the footrest assembly in FIG. 10 from the floor.

DETAILED DESCRIPTION OF THE PREFERRED EMBODIMENT

With reference to the drawings, an embodiment of the present invention will now be described. A footrest of the present invention has approximately the same configuration as that shown in FIG. 1 excepting a hole for inserting a tool therethrough as described later. The material of the footrest is also composed of soft plastic or resin material having excellent vibration absorbing characteristics, such as urethane, or expanded (or foamed) beads of polypropylene (PP) or polyethylene (PE), and the footrest is molded by forming dies. An injection molding process can be used to mold the footrest. However, any other injection type or different type molding process may also be used. The footrest is formed generally in a rectangular parallelepiped made in solid and of the soft material, so that upon a vehicle collision, the resulting impact against a foot placed on the footrest can be absorbed. A clip is fixedly disposed on the floor-facing side of the footrest. For fixing the clip, the clip is first positioned and held as an insert in a forming die, and is then embedded in the footrest during the molding process of the footrest. As compared to the conventional clip, the clip for a footrest assembly according to the present invention is greatly different from the conventional clip in structure as described later. While any number of clips may be selectively fixed in the footrest, it is often the case that a plurality (e.g. two) of clips are arranged in accord with a plurality of corresponding studs fixed on a floor of a vehicle body, such as threaded studs or rod-shaped studs each having a groove in the periphery thereof. In the following description, FIG. 1 should be referenced as for the footrest, in addition to other drawings.

Figure 2:
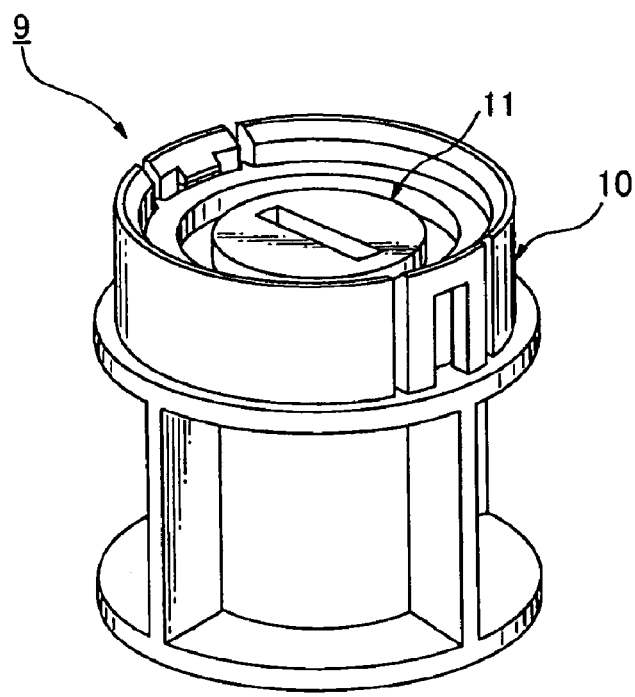
FIG. 2 is a perspective view of a clip according to an embodiment of the present invention.
Figure 3:
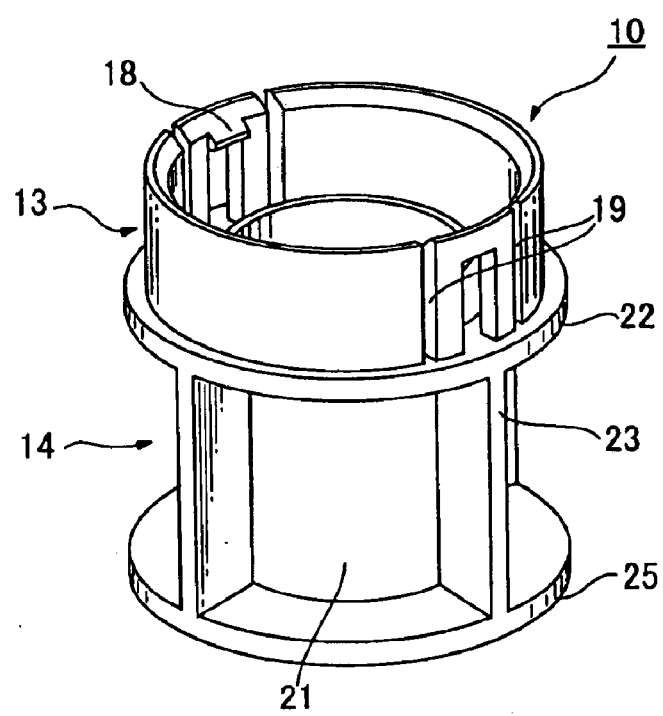
FIG. 3 is a perspective view of a first clip component of the clip according to the embodiment of the present invention.
Figure 4:
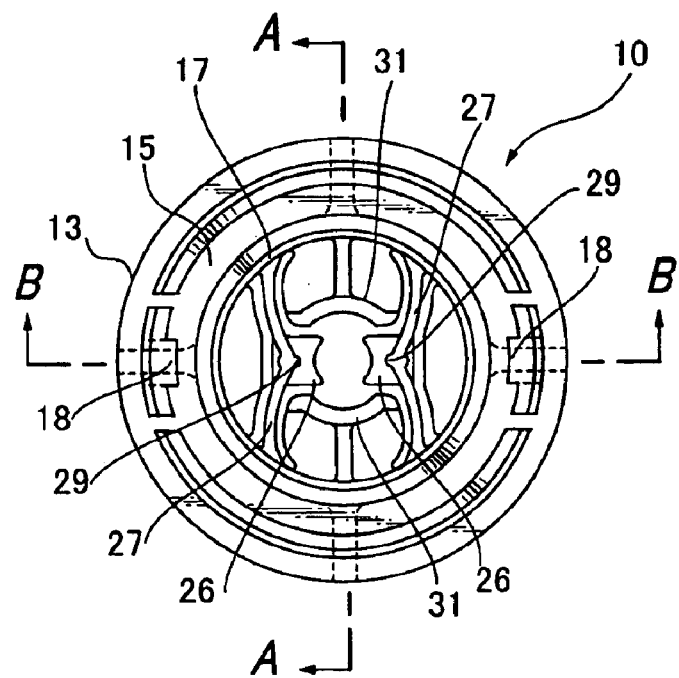
FIG. 4 is a top plan view of the first clip component in FIG. 3.
Figure 5:
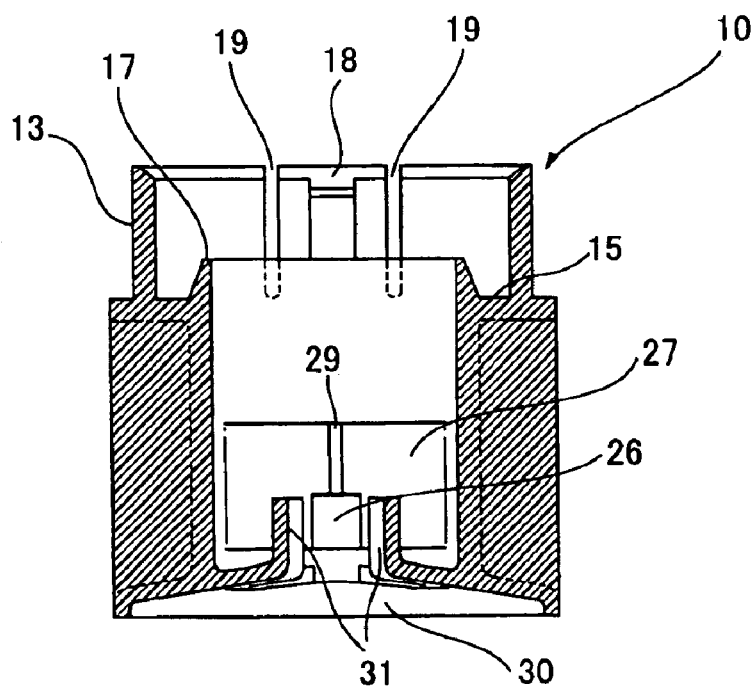
FIG. 5 is a sectional view of the first clip component taken along line A—A of FIG. 4.
Figure 6:
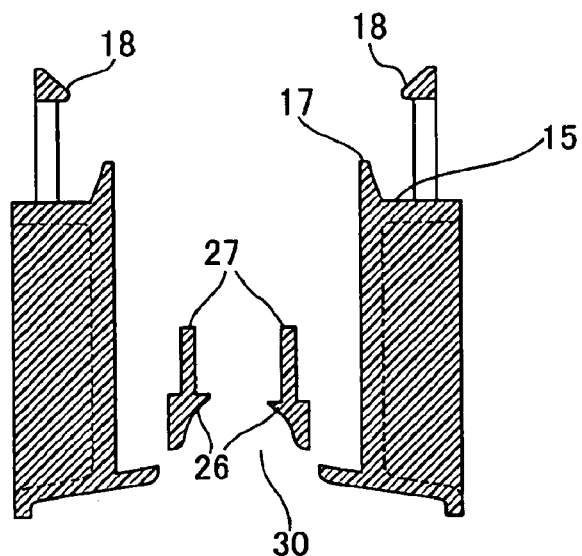
FIG. 6 is a sectional view of the first clip component taken along line B—B of FIG. 4.

With reference to FIGS. 2 to 8, a clip 9 for a footrest assembly according to the present invention will first be described. FIG. 6 is a general view showing the clip 9. The clip 9 is prepared prior to forming of the footrest because it is handled as an insert when the footrest is formed or molded, as described above. In order to provide a sufficient rigidity of the clip 9 for assuring reliable engagement with the stud and fixture of the footrest, the clip 9 is made of hard plastic material. As shown in FIG. 2, the clip 9 of the present invention is constructed as an assembly comprising a first clip component 10 having therein an engagement pawl adapted to engage with the stud, and a second clip component 11 capable of releasing the engagement between the engagement pawl of the first clip component 10 and the stud. The first clip component 10 is formed as a tubular body having therein the engagement pawl adapted to engage with the stud, and is adapted to be immovably fixed to the footrest. The second clip component 11 is received in a hollow portion of the first clip component 10 in a rotatable manner about the axis of the tubular body. The second clip component 11 can be selectively rotated by a certain angle between an engagement position where the engagement pawl of the first clip component 10 is allowed to engage with the stud and a release position where the engagement pawl is bent not to engage with the stud.

With reference to FIGS. 3 to 6, the details of the first clip component 10 will be described. The first clip component 10 is formed as a hollow cylindrical body in its entirely, and includes an upper segment 13 and a lower main body 14. The upper segment 13 receives a head of the second clip component 11 therein and holds the head of the second clip component in a manner that the head of the second clip component is prevented from moving vertically but is allowed to rotate about the axis of the first clip component 10. For this purpose, the upper segment 13 is formed as a circular ring (or torus) wall having a diameter slightly larger than the diameter of the head of the second clip component. As shown in FIGS. 4 and 5, the lower portion of the upper segment 13 is formed with a doughnut-shaped seat 15 for receiving the lower surface of the head of the second clip component. The inner peripheral edge of the seat 15 is formed as an annular rib 17 standing slightly upward. The annular rib 17 surrounds the inner periphery of a ring-shaped protrusion provided on the lower surface of the head of the second clip component to stably support the head of the second clip component in a rotatable manner and to sealingly prevent the material of the footrest from entering into the main body 14 during the molding process of the footrest. The upper portion of the circular ring wall-shaped upper segment 13 is formed with a lock pawl 18 for holding the head of the second clip component received in the hollow portion of the upper segment 13. Two of the lock pawls 18 are arranged to be diametrically opposed to one another so that the head of the second clip component is held at the two positions and prevented from coming off. Any number of lock pawls may be selectively provided according to need. In order to facilitate inserting the head of the second clip component into the hollow portion of the upper segment 13, each of the lock pawls 18 is adapted to be bent outward. For this purpose, a pair of slits 19 are provided at the both sides of the lock pawl 18 in the upper segment to facilitate bending of the elongate lock pawl 18. Each of the slits 19 also acts as a depression to be fitted with a corresponding protrusion provided on the side surface of the head of the second clip component. This fitting action allows the second clip component 11 to be held in the engagement position so as not to be improperly rotated therefrom.

The main body 14 of the first clip component 10 is formed as a tubular body for receiving the stud and for receiving a release cam which extends from the lower surface of the head of the second clip component. The main body 14 includes an outer peripheral wall extending continuously from the lower portion of the upper segment to a stud-receiving opening so as to surround the inner space of the main body. The clip disclosed in Japanese Patent Laid-Open No. 2000-168422 includes the outer peripheral wall having a molding hole for forming an engagement pawl or the like, whereas the peripheral wall 21 of the main body 14 has no hole and fully covers the inner space of the main body, as illustrated. Thus, the inner space of the main body 14 is sealed so as not to enter the material of the footrest thereinto during the molding process of the footrest. This eliminates the need for taking any means for preventing the material from entering into the hollow portion of the first clip component 10 during the molding process of the footrest. On the outer peripheral wall 21, a circular rib 22 is formed at the boundary between the upper segment 13 and the main body 14, and a plurality (four in this embodiment) of vertical ribs 23 each extending from the circular rib 22 toward the stud-receiving opening are formed with leaving a certain distance therebetween in the circumferential direction of the outer peripheral wall. Further, another circular rib 25 is formed on the side of the stud-receiving opening. These ribs 22, 23, 25 are advantageous to reinforcement of the first clip component 10. In addition, these ribs 22, 23, 25 bite into the footrest during the molding process of the footrest to prevent the first clip component 10 from moving in the axial or vertical direction (the circular ribs 22 and 25) and from rotating about its axis within the footrest (the vertical rib 23).

A pair of engagement pawls 26 adapted to engage with the stud are arranged to be opposed to one another in the inner space of the main body 14 of the first clip component 10. Each of the engagement pawls 26 is connected to and held by a corresponding resilient plate member 27 extending from the inner wall of the main body 14 so as to apply, to each of the engagement pawls 26, a resilience biasing in the direction allowing engagement with the stud. As shown in FIG. 5, each of the plate members 27 extends laterally from the both sides of the corresponding engagement pawl 26 and extends upward from the engagement pawl 26. Each of the plate members 27 including their upward extensions is arranged at a position engaging with the corresponding release cam (as described later) of the second clip component 11 and acts as a release lever for releasing the engagement between the corresponding engagement pawl 26 and the stud, and so it is referred to as a release lever 27. Each of the release levers 27 has a shape defined as serially connected two C-letters illustrated in FIG. 4 to allow the corresponding engagement pawl 26 to be applied with a resilience biasing in the direction allowing engagement with the stud and to be bent radially outward so that the engagement pawl 26 can move to the release position where it is prevented from engaging with the stud. Each of the release levers 27 is formed with a protrusion 29 slightly protruding radially inward of the central region thereof on the upper side of the corresponding engagement pawl 26 (see FIGS. 4 and 5). Each of the protrusions 29 can fit moderately with a depression formed at the central region of the corresponding release cam of the second clip component to stop the second clip component at the release position. At this moment, the release levers 27 are bent radially outward, and thereby the engagement pawls 26 move away from the stud to release the engagement therebetween.

The stud-receiving opening 30 is provided in the bottom of the first clip component 10. As shown in FIGS. 5 and 6, the stud-receiving opening 30 is tapered having an opening with a wide inlet to facilitate picking up the stud. A pair of upright guides 31 are arranged to be diametrically opposed to one another on the inside of the main body 14 in the vicinity of the engagement pawls 26 so as to guide the picked-up stud toward the center of the main body 14.

Figure 7:
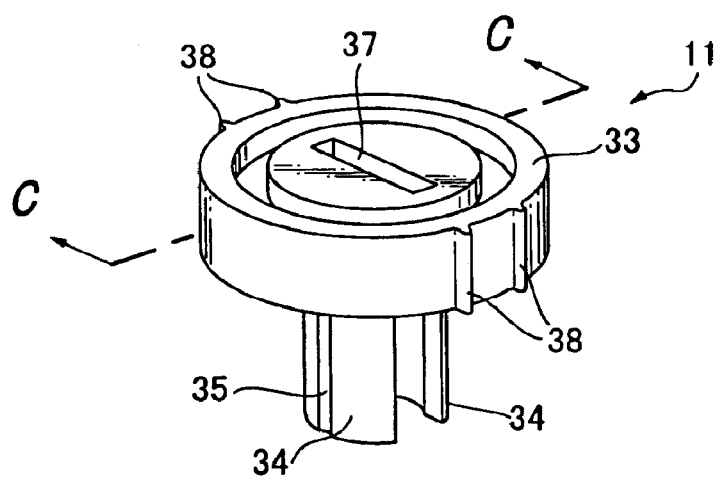
FIG. 7 is a perspective view of a second clip component of the clip according to the embodiment of the present invention.
Figure 8:
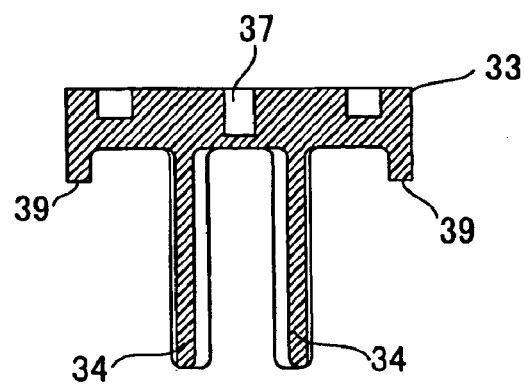
FIG. 8 is a sectional view of the second clip component taken along line C—C of FIG. 7.

With reference to FIGS. 7 and 8, the second clip component 11 will be described. The second clip component 11 includes the head 33 having a diameter to be received in the upper segment 13 of the first clip component 13, and the release cam 34 having a semicircular shape in cross section and extending downward from the head to the release lever 27 adjacent to the engagement pawl 26. Two of the release cams 34 are arranged to be diametrically opposed to one another, correspondingly to two of the combinations of the engagement pawls 26 and release levers 27. When the second clip component is in the engagement position, each of the release cams 34 is in a position incapable of engaging with the corresponding release lever 27 (or the corresponding engagement pawl 26 and its corresponding extension). This position is located on each extension of the guides 31 in FIG. 4 extending upward from the plane of the drawing sheet. When the release cams 34 are in this position, the second clip component 11 is in the engagement position, and thus the engagement pawls 26 are applied with the resilience biasing in the direction allowing engagement with the stud. On the other hand, when the second clip component 11 is in the release position, each of the release cams 34 engages with the central region of the corresponding release lever 27 (or the corresponding engagement pawl) and bends the release lever 27 (or the engagement pawl 26) radially outward to move the engagement pawl 26 away from the stud. In the illustrated embodiment, this position corresponds to that rotated by 90-degree from the engagement position. During this rotation, each of the release cams 34 having the semicircular shape in section engages with the corresponding release lever 27 to gradually smoothly bend the release lever 27 and the corresponding engagement pawls 26 radially outward. Further, each central region of the release cams 34 is formed with the depression 35 to be fitted moderately with the protrusion of the corresponding release lever 27. This prevents the second clip component 11 from improperly rotating from the release position, and allows an operator to perceive the completion of the rotation from the engagement position to the release position based on the fitting action.

The top surface of the head 33 of the second clip component 11 is formed with a tool engagement slot 37 which allows the second clip component 11 to be rotated with respect to the stationary first clip component 10 about the axis of the second clip component with a flat-head (or minus tipped) screwdriver or the like. While the slot may be a cross-shaped slot allowing a plus tipped (or Phillips) screwdriver to be engaged therewith, the minus slot as illustrated advantageously makes it possible to determine if the second clip component 11 is in the engagement position or the release position, by visually checking the slot from above. As a substitute for the tool engagement slot, any suitable tool engagement portion having a shape allowing a tool to be engaged therewith, such as a raised portion, may be used. Further, the side surface of the head 33 of the second clip component 11 is formed with two pairs of protrusions 38 which are arranged in accord with the two pairs of slits 19 in the inner peripheral surface of the upper segment 13 of the first clip component 10 surrounding the side surface of the head 33 and are fitted moderately with the two pairs of slits. Each of these protrusions 38 is located at a position where it fits with the corresponding slit 19 when the second clip component 11 is in the engagement position. This prevents the second clip component 11 from improperly rotating from the engagement position, and allows an operator to perceive the completion of the rotation from the release position to the engagement position based on the fitting action.

In this embodiment, each of the release cams 34 has a length extending to the corresponding release lever 27 but not to the corresponding engagement pawl 26. However, without providing the release levers, the release cams 34 may extend to the respective engagement pawls 26 to allow the engagement pawls 26 to be directly displaced or bent and released from the engagement position. In this case, the release cams should be arranged not to prevent the engagement pawls from engaging with the stud in the engagement position. The ring-shaped protrusion 39 is provided at the peripheral edge of the lower surface of the head 33. This ring-shaped protrusion 39 is brought into contact with the surface of the annular rib 17 of the first clip component 10 to stably support the head of the second clip component in a rotatable manner and to sealingly prevent the material of the footrest from entering into the hollow portion of the main body 14 during the molding process of the footrest.

Figure 9:
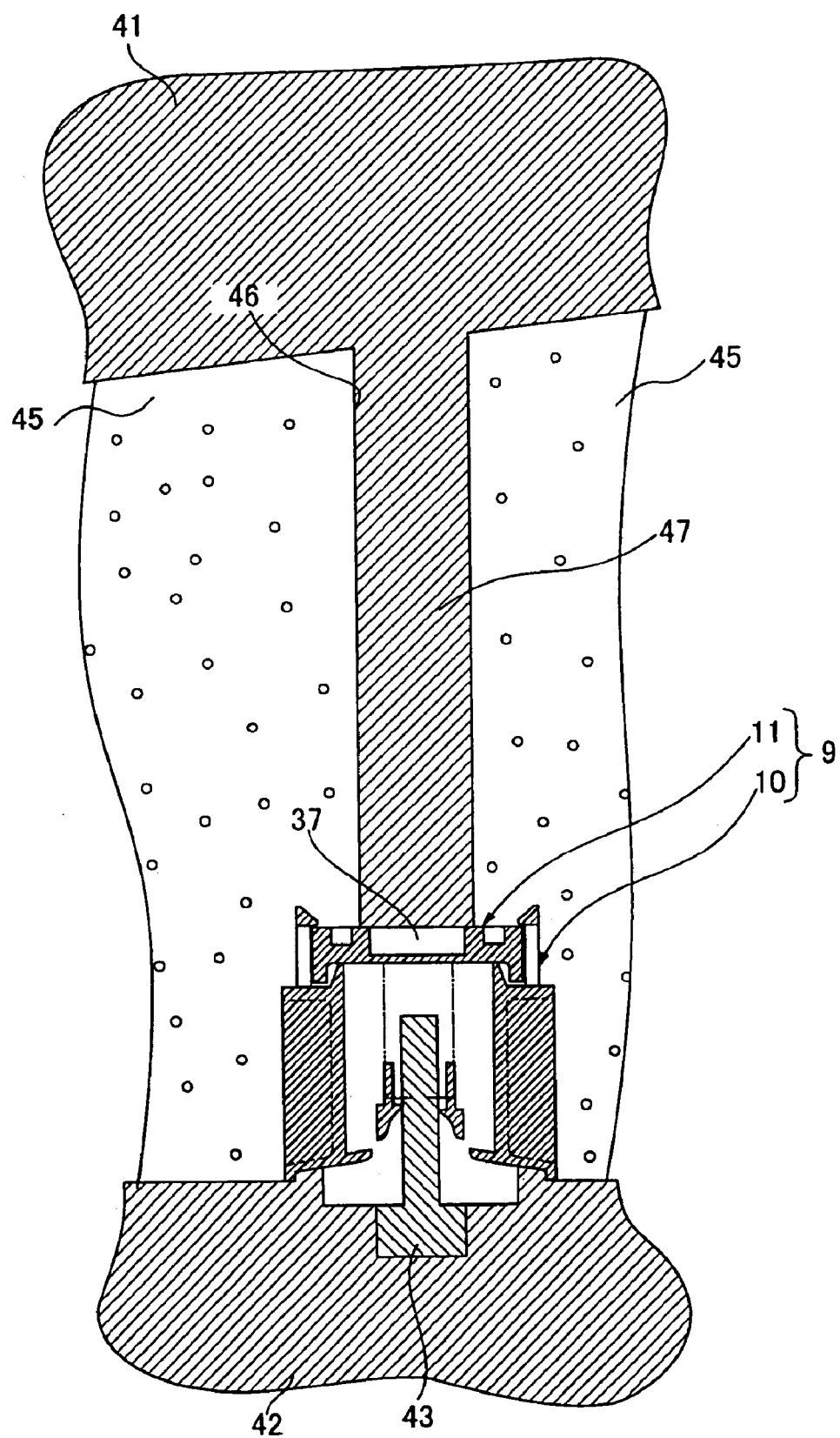
FIG. 9 is a partial sectional view showing the state that a footrest is molded using the clip according to the embodiment of the present invention as an insert.

The aforementioned first and second clip components 10 and 11 are assembled to receive the entire second clip component 11 in the first clip component 10, as shown in FIG. 2, and the completed clip 9 is provided. Then, the clip 9 assembled in this way is delivered to a footrest manufacturing plant or the like. In manufacturing processes of the footrest assembly, when the footrest is molded, the clip 9 is handled as an insert and fixed at a predetermined position in forming dies. FIG. 9 shows the state of this insert molding. In FIG. 9, the footrest is molded by forming dies 41 and 42. A locating pin 43 for positioning the clip 9 is fixed at a predetermined position of the forming die 42. The clip 9 is fixed at a predetermined position of the footrest 45 by attaching the clip 9 to the locating pin 43. A molding material is injected into a cavity between the forming dies 41 and 42 to mold the footrest 45. While only a portion of the footrest 45 is shown in FIG. 9, its entire configuration is similar to the footrest 2 in FIG. 1. However, the footrest of the present invention will be provided with a hole 46 extending from the surface thereof to the position where the clip 9 is attached, to allow a tool to be engaged with the tool engagement slot 37 provided in the top surface of the head of the second clip component 11. For this purpose, the forming die 41 has a rod-shaped protrusion 47 for forming the hole 46. Further, differently from the footrest in FIG. 1, it is unnecessary to provide a slit and seal member for preventing the material of the footrest from entering into the clip. Further, since the annular rib 17 of the first clip component is pressed to the second clip component 11 by the protrusion 47, the function for preventing the material of the footrest from entering into the clip is enhanced.

Figure 1:
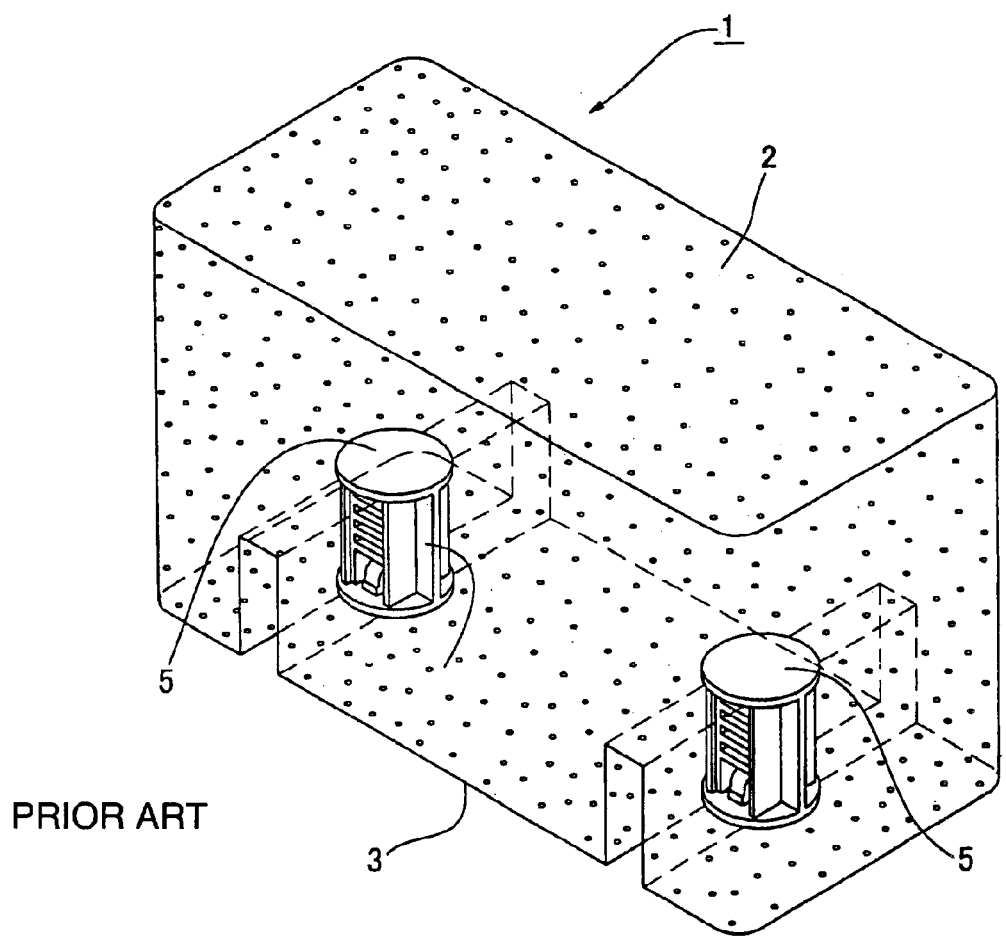
FIG. 1 is a perspective view of a conventional footrest assembly as shown in Japanese Patent Laid-Open No. 2000-168422.

Through the molding process of the footrest, the clip is immovably fixed to the footrest 45, while keeping from moving in the axial or vertical direction and rotating about its axis by the circular ribs 22, 25 and the vertical rib 23. Thus, when the second clip component 11 is rotated, the first clip component is never rotated together. This can assure the selective angular rotation of the second clip component 11 between the engagement and release positions. On the other hand, even if it is tried to improperly lift and detach the footrest, the footrest 45 never separates from the clip 9 and thereby the footrest 45 is kept in its reliably fixed state by the clip 9. Typically, the clip 9 is fixed in the footrest 45 at each of two positions as shown in FIG. 1.

FIGS. 10A and 10B (particularly FIG. 10B) shows the state that a footrest assembly 49 comprising the clip 9 and the footrest 45 to which the clip 9 immovably fixed is fixed to the floor 50 by attaching the clip 9 to the threaded stud 51 (or a rod-shaped stud having a groove in the periphery thereof) mounted on the vehicle floor 50. This attaching operation can be completed only by placing the floor-facing surface of the footrest at a position opposed to the corresponding threaded stud standing on the floor, positioning the clip with respect to the threaded stud, and pushing the footrest toward the floor with receiving the stud in the clip. FIG. 10A is a sectional view taken along the line D—D of FIG. 10B, and shows the state that the engagement pawl 26 engages with the stud 51. When the footrest assembly 49 is detached from the floor 50 for replacement or the like, the front edge 53 of a minus tipped or flat-head screwdriver is inserted from the hole 46 of the footrest 45 toward the head 33 of the second clip component 11 of the clip 9 and is engaged with the tool engagement slot 37.

In FIG. 11A and 11B, the front edge 53 of the flat-head screwdriver engaged with the tool engagement slot 37 is rotated by 90-degree to angularly rotate the second clip component 11 from the engagement position to the release position. By this angular rotation, the head 33 of the second clip component 11 is rotated. Thus, the release cams 34 bends the release levers 27 radially outward and thereby the engagement pawls 26 moves apart from the stud 51 to release the engagement therebetween. FIG. 11A is a sectional view taken along the line E—E of FIG. 11A. The reference numeral 54 in FIG. 11B indicates a distance between the extendedly bent engagement pawls. When the second clip component 11 is rotated to the release position, the depression 35 at the central region of the release cam 34 fits moderately with the protrusion 29 of the release lever 27. Thus, an operator can perceive the completion of the rotation from the engagement position to the release position based on the fitting action (clicking action). This also prevents the second clip component 11 from improperly rotating from the release position and allows the second clip component 11 to be kept in the release position. When two of the clips 9 are provided, the whole of the footrest assembly 49 can be detached from the floor by rotating both of the second clip components of the clips to the release position, and then lifting the footrest 45.

According to the present invention, with keeping the shock absorbing effect of the footrest, the footrest assembly can be reliably positioned and fixed to the floor by the first clip component. In addition, the engagement between the first clip component and the stud can be released only by rotating the second clip component by a certain angle from the engagement position to the release position, and thereby the whole of the footrest assembly can be readily detached from the floor. When the detached footrest assembly is reused, the second clip component is returned to the engagement position to allow the first clip component to be engaged with the stud, and then the footrest assembly is pushed toward the floor with receiving the stud in the first clip component. Thus, the footrest assembly can be mounted on the floor to facilitate the reuse.

Further, in the clip for the footrest assembly of the present invention, the engagement between the first clip component and the stud can be released only by rotating the second clip component by a certain angle from the engagement position to the release position, and thereby the whole of the footrest assembly can be readily detached from the floor. When the detached footrest assembly is reused, the second clip component is returned to the engagement position to allow the first clip component to be engaged with the stud, and then the footrest assembly is pushed toward the floor with receiving the stud in the first clip component. Thus, the footrest assembly can be mounted on the floor to facilitate the reuse. In addition, the second clip component is received in the first clip component to form a single clip in their entirety. This allows the clip to be integrally molded with the footrest, as an insert during the molding process of the footrest.

I claim:

1. A footrest assembly including: a solid footrest made of plastic material; and a clip provided on the floor-facing side of said footrest to receive therein a stud fixed on a floor of a vehicle body, said stud being formed as a threaded stud or a rod-shaped stud having a groove in the periphery thereof, whereby said footrest can be mounted on said floor by pushing said footrest toward said floor to receive said stud in said clip, wherein said clip comprises a first clip component having an engagement pawl adapted to engage with said stud, and a second clip component capable of releasing the engagement between said engagement pawl of said first clip component and said stud, wherein said first clip component is formed in a tubular body having said engagement pawl on the inside thereof, said first clip component being immovably fixed to said footrest, and wherein said second clip component is received in the tubular portion of said first clip component in a rotatable manner about the axis of said tubular portion to allow selective angular rotation of said second clip component between an engagement position where said engagement pawl of said first clip component is allowed to engage with said stud and a release position where said engagement pawl is bent not to engage with said stud.

2. A footrest assembly as defined in claim 1, wherein said second clip component is formed to be received in said first clip component in its entirety; said second clip component includes a head having a diameter to be received in an upper segment of said first clip component, and a release cam extending downward from said head to a position adjacent to said engagement pawl, said release cam being formed not to engage with both said engagement pawl and an extension of said engagement pawl when said second clip component is in said engagement position but to engage with said engagement pawl or said extension of said engagement pawl so as to move said engagement pawl away from said stud when said second clip component is in said release position, and wherein the top surface of said head of said second clip component is formed with a tool engagement portion, and said footrest is formed with a hole extending from the surface thereof to allow a tool to be engaged with said tool engagement portion.

3. A footrest assembly as defined in claim 2, wherein a side surface of said head of said second clip component and an inner peripheral surface of said first clip component surrounding said side surface of said head are formed with a combination of a protrusion and a depression to be fitted moderately with said protrusion, for preventing the angular rotation of said second clip component when said second clip component is in said engagement position.

4. A footrest assembly as defined in claim 2, wherein said engagement pawl of said first clip component is provided with a release lever at a position engaging with said release cam, and said release lever is connected to an inner wall of said tubular body of said first clip component so that said engagement pawl is applied with a resilience biasing in the direction allowing engagement with said stud, and said release lever is formed to be bent to allow said engagement pawl moving radially outward to disengage from said stud when said release cam engages with said release lever at said release position.

5. A footrest assembly as defined in claim 4, wherein said release lever and said release cam are formed with a combination of a protrusion and a depression to be fitted moderately with said protrusion, for preventing the angular rotation of said second clip component when said second clip component is in said release position.

6. A footrest assembly as defined in claim 2, wherein said head of said second clip component is formed as a circular plate to be brought into tight contact with a hollowed cylindrical portion formed in said upper segment of said first clip component so as to seal said upper segment of said first clip component, and said first clip component has an outer peripheral wall extending continuously from said upper segment to a stud-receiving opening so as to surround the inner space of said first clip component, whereby during the molding process of said footrest, the plastic material is prevented from entering inside said first clip component.

7. A clip for a footrest assembly, said clip being provided on the floor-facing side of a solid footrest made of plastic material so as to fixedly mount said footrest on a floor of a vehicle body by use of a stud fixed on said floor, said stud being formed in either a threaded stud or a rod-shaped stud having a groove in the periphery thereof, said clip comprising:

a first clip component having an engagement pawl adapted to engage with said stud; and a second clip component capable of releasing the engagement between said engagement pawl of said first clip component and said stud, wherein said first clip component is formed as a tubular body having said engagement pawl on the inside thereof, said first clip component being adapted to be immovably fixed to the footrest, and said second clip component is received in a tubular portion of said first clip component in a rotatable manner about the axis of said tubular portion to allow selective angular rotation of said second clip component between an engagement position where said engagement pawl of said first clip component is allowed to engage with said stud and a release position where said engagement pawl is bent not to engage with said stud.

8. A clip as defined in claim 7, wherein said second clip component is formed to be received in said first clip component in its entirety; said second clip component includes a head having a diameter to be received in an upper segment of said first clip component, and a release cam extending downward from said head to a position adjacent to said engagement pawl, said release cam being formed not to engage with both said engagement pawl and an extension of said engagement pawl when said second clip component is in said engagement position but to engage with said engagement pawl or said extension of said engagement pawl so as to move said engagement pawl away from said stud when said second clip component is in said release position; and the top surface of said head of said second clip component is formed with a tool engagement portion.

9. A clip as defined in claim 8, wherein a side surface of said head of said second clip component and an inner peripheral surface of said first clip component surrounding said side surface of said head are formed with a combination of a protrusion and a depression to be fitted moderately with said protrusion, for preventing the angular rotation of said second clip component when said second clip component is in said engagement position.

10. A clip as defined in claim 7, wherein said engagement pawl of said first clip component is provided with a release lever at a position engaging with said release cam, and said release lever is connected to an inner wall of said tubular body of said first clip component so that said engagement pawl is applied with a resilience biasing in the direction allowing engagement with said stud, and said release lever is formed to be bent to allow said engagement pawl moving radially outward to disengage from said stud when said release cam engages with said release lever at said release position.

11. A clip as defined in claim 10, wherein said release lever and said release cam are formed with a combination of a protrusion and a depression to be fitted moderately with said protrusion, for preventing the angular rotation of said second clip component when said second clip component is in said release position.

12. A clip as defined in claim 8, wherein said head of said second clip component is formed as a circular plate to be brought into tight contact with a hollowed cylindrical portion formed in said upper segment of said first clip component so as to seal said upper segment of said first clip component, and said first clip component has an outer peripheral wall extending continuously from said upper segment to a stud-receiving opening so as to surround the inner space of said first clip component, whereby during the molding process of said footrest, the plastic material is prevented from entering inside said first clip component.

* * * * *